Aug. 28, 1951 T. W. F. BROWN ET AL 2,565,648
ELASTIC FLUID TURBINE CONNECTION
Filed April 8, 1947 3 Sheets-Sheet 1

INVENTORS
THOMAS WALTER FALCONER BROWN
HENRY GEORGE YATES
BY
ATTORNEYS

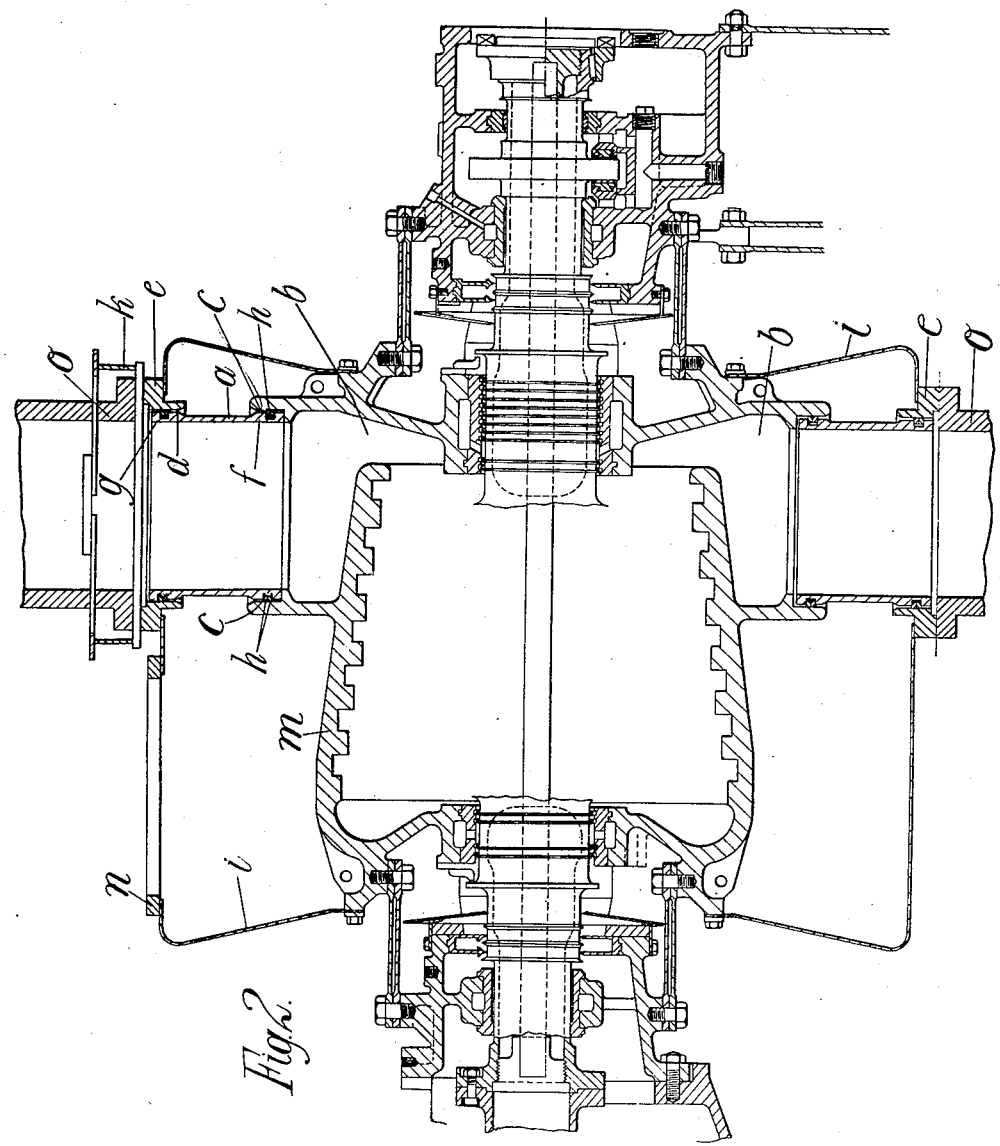

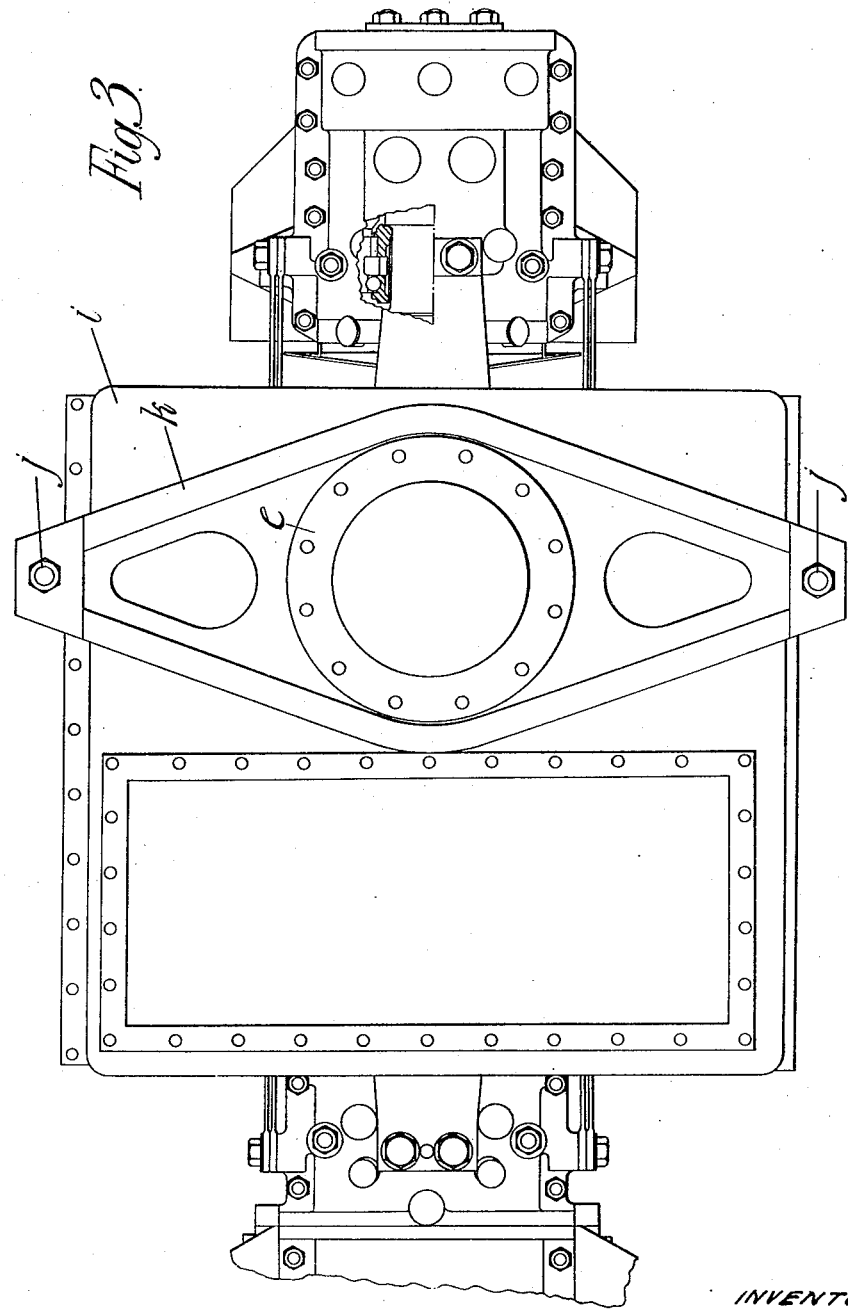

Patented Aug. 28, 1951

2,565,648

UNITED STATES PATENT OFFICE 2,565,648

ELASTIC FLUID TURBINE CONNECTION

Thomas Walter Falconer Brown, Newcastle-on-Tyne, and Henry George Yates, Northumberland, England, assignors to The Parsons and Marine Engineering Turbine Research and Development Association, Wallsend, England Application April 8, 1947, Serial No. 740,248
In Great Britain May 7, 1946

1 Claim. (Cl. 285—10)

This invention relates to elastic fluid turbines. Owing to the high temperature at which such turbines operate, considerable expansion of the casing takes place which is liable to impose severe stresses thereupon due to pipes or other elements rigidly connected to the turbine casing, and the object of the present invention is to provide simple means for overcoming this difficulty.

The invention consists in means for coupling piping or the like to the barrel of an elastic fluid turbine as set forth in the claims appended hereto.

Referring to the accompanying diagrammatic drawings:

Figure 2 is a longitudinal sectional view thereof, and

Figure 3 is a plan view thereof partly in section.

Figure 1:
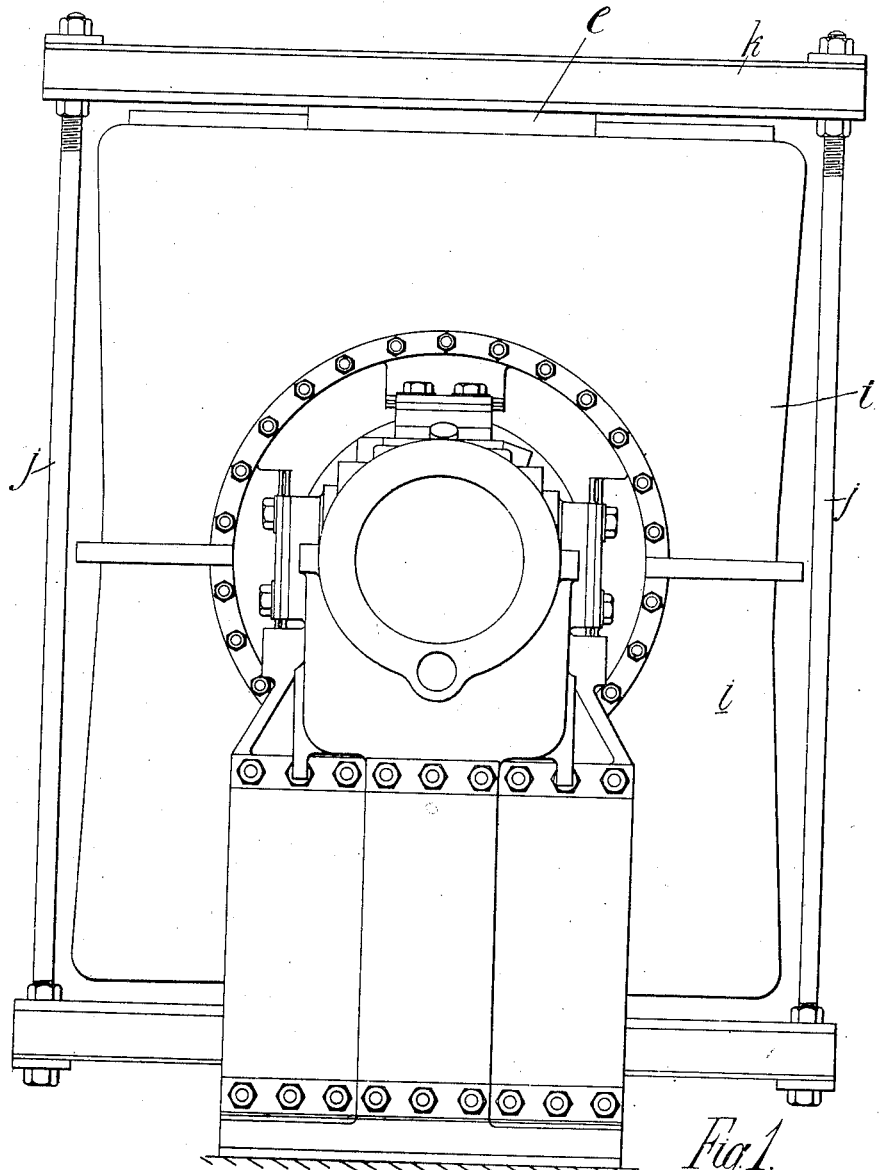
Figure 1 is an end view of one convenient construction of gas turbine embodying the present invention.

In carrying the invention into effect according to one convenient form illustrated by way of example in Figures 1 to 3 as applied to a double flow reaction elastic fluid turbine having inlet pipes led diametrically to the casing, we connect two inlet pipes $o$ $o$ to two flanged rings $e$ $e$ disposed diametrically opposite each other and tied together by tie rods $j$ external to the turbine and attached at their ends to transverse yokes $k$. We provide yieldable sleeves $a$ $a$ between rings $e$ and the inlet ducts $b$ $b$ of the turbine barrel $m$. These inlet ducts are furnished with cylindrical internal surfaces $c$ $c$ and similar surfaces $d$ $d$ are provided within the rings $e$ $e$ and the ends $f$ $g$ of the tubes $a$ engage these surfaces respectively so that the tubes $a$ $a$ constitute yieldable sleeves the ends of the sleeves being furnished with split sealing rings $h$ $h$ engaging the cylindrical internal surfaces.

The arrangement of the sleeves $a$ $a$ diametrically opposite one another in conjunction with the cross tying of the rings $e$ $e$ is such as to balance residual forces on the turbine barrel $m$ arising from fluid pressure, and to allow substantial freedom for the barrel to expand axially and radially without restraint imposed by the inlet pipes. Freedom of expansion of the barrel $m$ without restraint imposed by the outlet pipe (not shown) connected to the ring $n$ is assured by providing a comparatively thin external casing $i$ attached to the rings $e$ $e$ and barrel $m$.

The turbine casing, in the example illustrated, is mounted on a floating suspension as described in copending U. S. A. Specification No. 740,247.

If desired, the split sealing rings $h$, to reduce leakage when relative expansion takes place between the tubes $a$ $a$ and the cylindrical surfaces of the rings $e$ $e$ and ducts $b$ $b$ adjacent thereto, may be substituted by plain external flanges or peripheral ribs.

What is claimed is:

Means for coupling diametrically opposed piping elements to opposite sides of an elastic fluid turbine barrel which is liable to expand and thus moves substantially in all directions relatively to said piping, comprising a pair of sleeve elements diametrically disposed on opposite sides of the barrel in position for coupling the piping elements thereto, means for yieldably supporting each said sleeve element at one end by the barrel and means for yieldably supporting each said sleeve element at the other end by a part rigid with the piping element coupled thereto, thereby providing freedom for expansion of the barrel in all directions without restraint by the piping elements, the last said means comprising a member for yieldably supporting each said sleeve element and adapted to be fastened to a pipe, and tie means holding the two said members together.

THOMAS WALTER FALCONER BROWN.
HENRY GEORGE YATES.

REFERENCES CITED

The following references are of record in the file of this patent:

UNITED STATES PATENTS

| Number | Name | Date |
|---|---|---|
| 1,527,310 | Kinzbach | Feb. 24, 1925 |
| 1,968,715 | Slade | July 31, 1934 |
| 2,195,547 | Vickers et al. | Apr. 2, 1940 |
| 2,278,152 | Semar | Mar. 31, 1942 |
| 2,304,993 | Franck | Dec. 15, 1942 |
| 2,432,592 | Stecher | Dec. 16, 1947 |
| 2,437,385 | Halford | Mar. 9, 1948 |

FOREIGN PATENTS

| Number | Country | Date |
|---|---|---|
| 668,033 | France | Oct. 26, 1929 |